United States Patent [19]

Kodera et al.

[11] Patent Number: 5,016,017

[45] Date of Patent: May 14, 1991

[54] DOPPLER RADAR SPEED DETECTING METHOD AND APPARATUS THEREFOR

[75] Inventors: Masao Kodera, Okazaki; Kunihiko Sasaki; Seishin Mikami, both of Aichi; Jyunshi Utsu, Nishio, all of Japan

[73] Assignee: Nippon Soken, Inc., Nishio, Japan

[21] Appl. No.: 447,905

[22] Filed: Dec. 8, 1989

[30] Foreign Application Priority Data

Dec. 27, 1988 [JP] Japan ................. 63-331138

[51] Int. Cl.$^5$ .............................................. G01S 13/60
[52] U.S. Cl. ....................... 342/106; 342/70; 342/115
[58] Field of Search ............... 342/106, 115, 104, 70, 342/71, 72

[56] References Cited

U.S. PATENT DOCUMENTS

| | | | |
|---|---|---|---|
| 3,898,652 | 8/1975 | Rashid | 342/59 |
| 3,898,655 | 8/1975 | Tresselt | 342/83 |
| 3,918,058 | 11/1975 | Noyori et al. | 342/71 |
| 3,952,301 | 4/1976 | Sorkin | 342/71 |
| 4,063,237 | 12/1977 | Nier et al. | 342/7 VM |
| 4,063,238 | 12/1977 | Conner, Jr. | 342/70 |
| 4,148,028 | 4/1979 | Fujiki | 342/21 |
| 4,150,375 | 4/1979 | Ross et al. | 342/70 |
| 4,203,113 | 5/1980 | Baghdady | 342/71 |
| 4,346,774 | 8/1982 | Hirota et al. | 342/71 X |
| 4,354,191 | 10/1982 | Matsumara et al. | 342/83 |
| 4,366,546 | 12/1982 | Tachibana et al. | 342/71 X |
| 4,414,548 | 11/1983 | Carpenter et al. | 342/117 |
| 4,527,160 | 7/1985 | Endo . | |
| 4,552,456 | 11/1985 | Endo | 356/5 |
| 4,673,937 | 6/1987 | Davis | 342/72 |
| 4,675,822 | 6/1987 | Marino et al. | 342/106 X |
| 4,703,429 | 10/1987 | Sakata | 364/426 |

FOREIGN PATENT DOCUMENTS

58-39971 3/1983 Japan .
62-3508 1/1987 Japan .

*Primary Examiner*—John B. Sotomayor
*Attorney, Agent, or Firm*—Cushman, Darby & Cushman

[57] ABSTRACT

A Doppler radar speed detecting method in which periods of a Doppler signal are measured within a predetermined sampling time, and frequency data corresponding to the thus obtained period data are obtained. Upper and lower limit values are set based on the previous Doppler frequency $F(k-1)$. The frequency data are compared with these limit values. Frequency data within a low region lower than the lower limit value, and intermedaite region between the lower and upper limit values, and a high region higher than the upper limit value are respectively counted in accordance with the comparison. Further, for the frequency data between the lower and upper limits, an integrated value of differences between these data and the previous Doppler frequency is obtained. From these integrated value and the numbers of frequency data, the change from the previous to the present Doppler frequency is calculated. By adding this change and the previous Doppler frequency together, the present Doppler frequency is obtained.

22 Claims, 8 Drawing Sheets

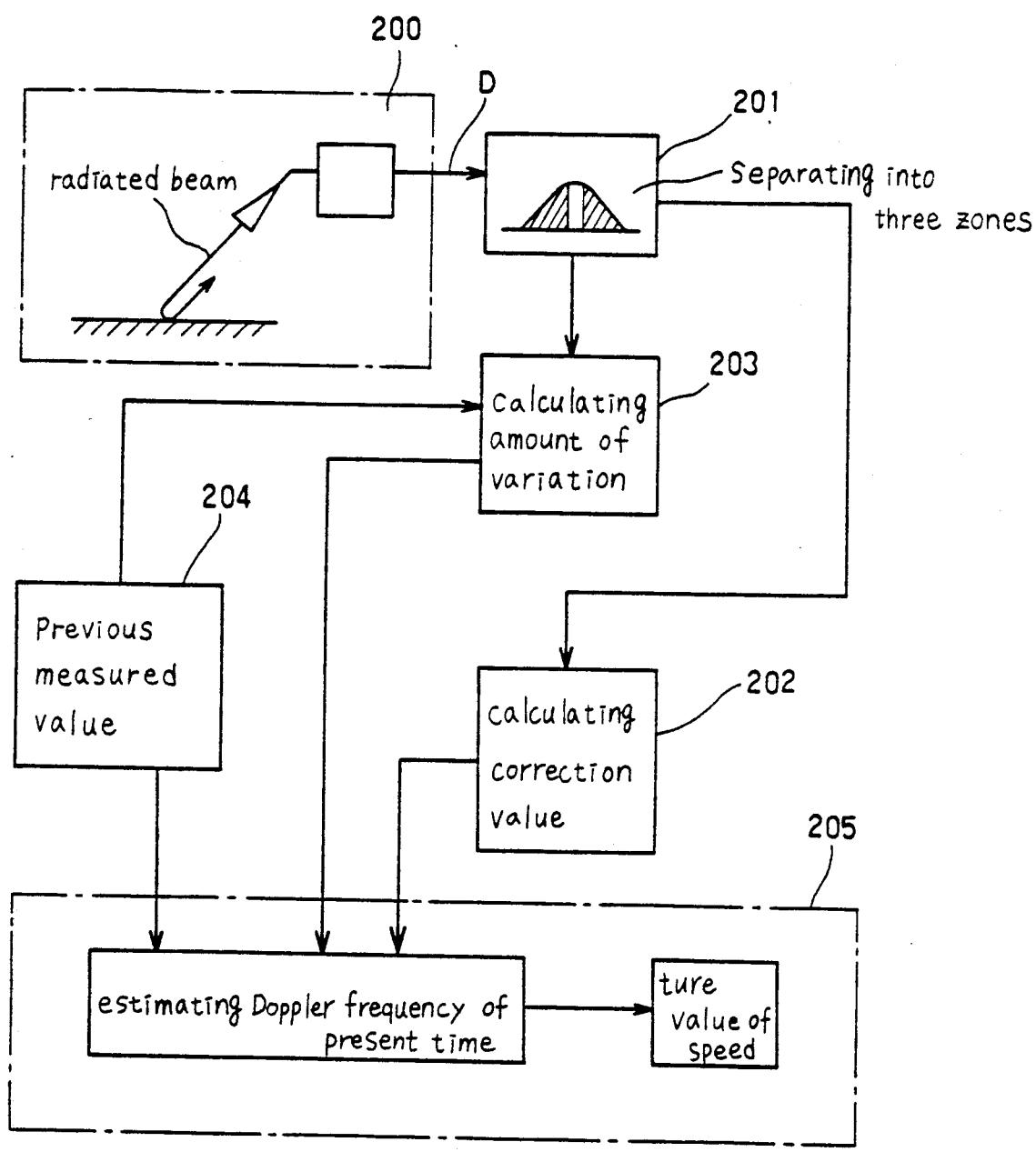

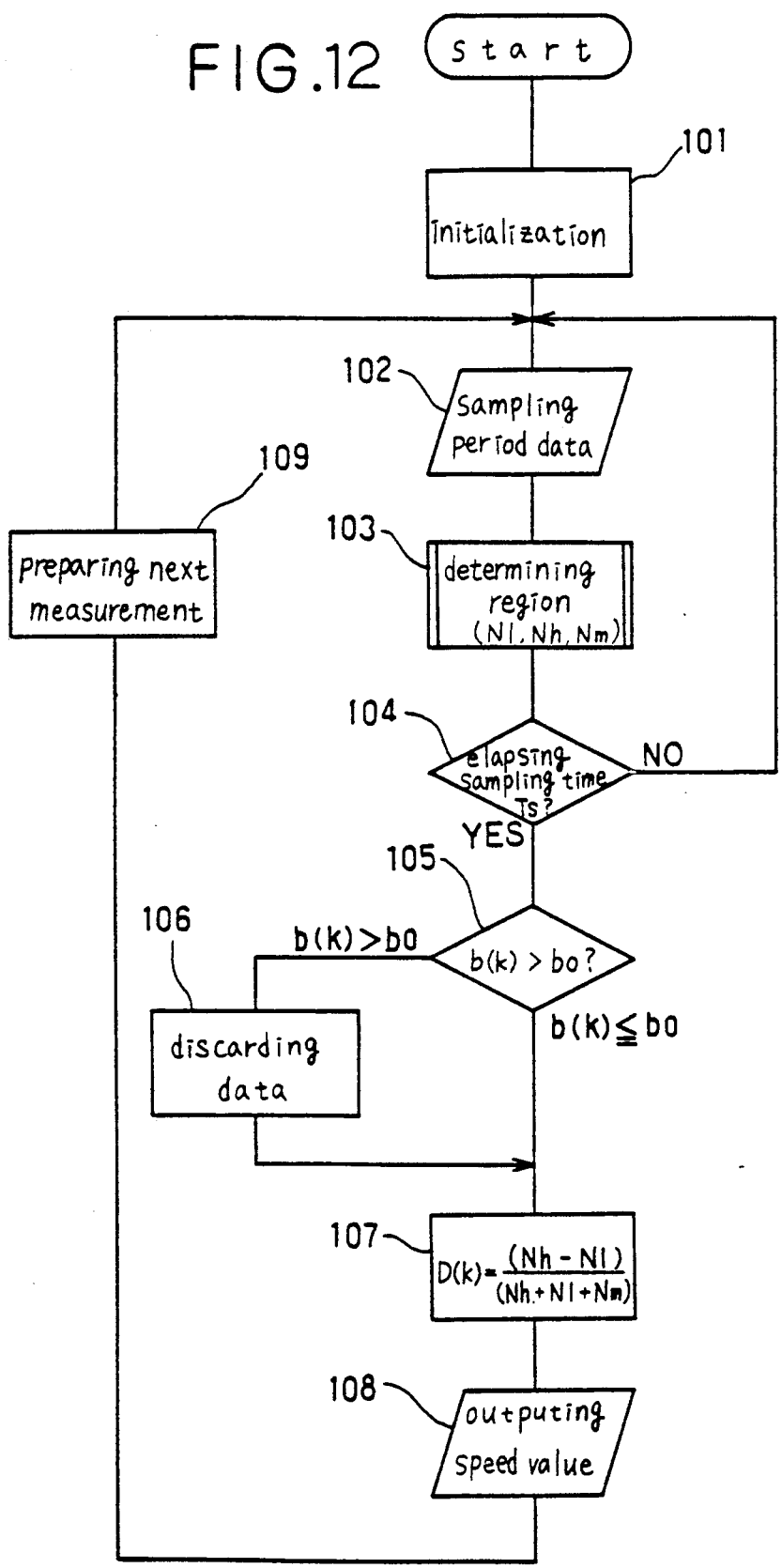

DOPPLER RADAR SPEED DETECTING METHOD AND APPARATUS THEREFOR

BACKGROUND OF THE INVENTION

1. Filed of the Invention

The present invention relates to a Doppler radar speed detecting method, i.e. a method for detecting a speed based on the Doppler effect, and apparatus for implementing such a method, which are for use with an anti-skid controller mounted on an automobile, for example.

2. Prior Art

Apparatus implementing such methods, mounted on an automobile, for example, will direct an electric wave such as a microwave or a millimeter wave, or an acoustic wave from an antenna mounted on the automobile toward the surface of a road, and detect the Doppler frequency (fd) corresponding to the speed of the automobile from the reflected waves from the road surface. In fact, however, the beam from the antenna will diverge with an angle $\theta$, as shown in FIG. 2a. As shown in FIG. 2b, the Doppler signal consequently includes various frequency components whose amplitude and phase will vary depending on the state of the road surface.

FIG. 2a illustrates the known principle of the Doppler radar. In FIG. 2a: $\phi$ represents the angle between the center axis of the radiated beam and a direction perpendicular to a road surface;

V represents the speed, expressed in meters per second, of the automobile; and $\lambda$ represents the wave length, expressed in meters, of the radiated microwave The theoretical Doppler frequency fd (also referred to as "theoretical frequency") is expressed as follows:

$$fd = 2V/\lambda \sin\phi (Hz),$$

and therefore, fd is proportional to "V sin$\phi$".

FIG. 2b shows the distribution of electric power for different frequency components of the Doppler signal obtained from the microwave reflected by the road surface. Typically, the distribution may be a Bell-shaped distribution centered at the theoretical frequency fd with the divergence caused by the angle $\theta$.

In the actual apparatus, however, the speed of an automobile is calculated by an electronic circuit at regular intervals of 0.1 sec. while the automobile is running. This limits the sampling time before the calculation and thus limits the amount of data concerning the reflected wave which can be taken by the apparatus. FIG. 3 and 4 show histograms which schematically represent the number of occurrences of data for Doppler frequency regions, wherein any given value of the Doppler frequency on the X-axis o abscissa is represented as the distance from the ordinate.

The number of occurrences Doppler frequencies as plotted in FIG. 3 exhibits a distribution which has a maximum at the theoretical frequency fd and is symmetrical with respect to the maximum. However, such a distribution occurs when the sampling period is sufficiently long and therefore the number of sampled data is sufficiently large. When the sampling period is short and therefore the number of sampled data is small, however, the maximum is not necessarily equal to the theoretical frequency fd and the distribution may be distorted, as shown in FIG. 4. Speed detectors used for controlling various operations associated with the running of an automobile such as, for example, anti-skid controllers, need to have a quick response Therefore, because the number of sampled data is thus limited, prior art methods of calculating the Doppler frequency would produce an output including an error. These prior art methods have operated by counting the number of pulses during the sampling period, which pulses are obtained by converting the Doppler signal into the pulses by means of comparators, or by obtaining the mean value of data about pulse periods.

Another problem with these prior art methods have occurred when the reflecting surface is smooth, for example when the road surface is covered with a film of water due to rain, for example. This causes additional low frequency reflections. Therefore, the distribution of occurrence of Doppler frequencies extends into low frequency regions (to the left), as shown in FIG. 5. The above-mentioned prior art methods then produce an output including an increased error.

Japanese published unexamined patent application No. 57-194371 corresponding to U.S. Pat. No. 4,527,160 discloses a method of reducing the error by detecting the maximum value of the spectrum, on the assumption that the number of occurrence of Doppler frequencies should have their maximum at the theoretical frequency fd. When the amount of period data about the Doppler signal is not sufficient, the maximum value of the frequencies of occurrence is not necessarily equal to the theoretical frequency fd, and therefore such a method cannot serve as effective means where a quick response is required.

In Japanese published unexamined patent application No. 58-39971, a predetermined number of time periods, each corresponding to N times the wavelength of the reflected wave which is frequency-shifted under the Doppler effect, are collected as data and those ones of the data which are clearly out of the speed range of the moving object are discarded. Where errors due to variations of the period data within the speed range of the moving object become a problem, as previously described in conjunction with FIG. 4, this method cannot reduce the errors. In accordance with this method, effective ones of said time period data are further collected a predetermined number of times, and the mean value and standard deviation of these values are calculated. Those data which are out of the range between the mean value minus the standard deviation and the mean value plus the standard deviation are excluded, and the mean value of only the remaining data is obtained. Thus if the number of data is in sufficient, a statistically significant sample cannot be obtained and the signal processing cannot substantially reduce the errors. In particular, for data like that shown in FIG. 5, this method can reduce the errors only mininally, if at all.

SUMMARY OF THE INVENTION

In view of the above-mentioned various problems, a first object of the present invention is to more exactly find a value which is nearest to the true Doppler frequency and thereby to detect the exact speed even if the Doppler signal includes many frequency components and the number of occurrence of Doppler frequencies do not exhibit a maximum at the theoretical frequency (fd). In other words, even if the sampling time is set to a short length for the purpose of obtaining a quick response, an accurate detection will still be obtainable. Another object of the present invention is to obtain a very accurate speed by discarding abnormal data even if the Doppler frequencies have a largely varying dispersion due to variations of the state of the reflecting surface from which a wave is reflected, such as the road surface on which the moving object runs.

The present invention estimates the true value of the Doppler frequency at predetermined intervals to obtain the speed, utilizing the fact that the true Doppler frequency can be basically obtained by adding the variation to the previously obtained Doppler frequency value. That is, in FIG. 1 which shows the principle of the Doppler radar speed detecting method of the present invention, a Doppler signal is detected at step 200. At step 201, the measured data D obtained at step 200 is separated into three zones, namely first, second and third zones, on the basis of the previously obtained Doppler frequency. At step 202, it is determined from the relation of these zones with respect to their frequencies how the moving object is acceleration or decelerated from the previous time to the present time, and a correction value is calculated from the determination. Meanwhile, at step 203, an amount of variation representing a viaration from a previous time to the present time, is obtained from the previously obtained measured value of the Doppler frequency stored at step 204. At step 205, this amount of variation, the correction value and the measured value of the previous time are used to estimate true value of the Doppler frequency of the present time, i.e. the true value of the speed.

Further, the present invention has the steps of obtaining the degree of dispersion of said measured data D, and discarding those data belonging to said first zone if the degree of dispersion is larger than a predetermined quantity. It is thus possible to discard those data which clearly appear to be abnormal even when the dispersion of the Doppler frequency largely varies depending on the state of the reflecting surface.

Further, the present invention includes apparatus for implementing the Doppler radar vehicle-speed detecting method.

BRIEF DESCRIPTION OF THE DRAWINGS

FIG. 1 is an illustration showing the principle of the Doppler radar vehicle-speed detecting method of the present invention;

FIG. 2b is an illustration showing power distribution over frequencies with respect to a Doppler signal obtained from the reflected radiated beam of FIG. 2a;

FIGS. 3-5 are schematic illustrations showing data generally obtained from the known Doppler radar apparatus, of which FIG. 3 shows a case in which the number of data is relatively large, FIG. 4 shows a characteristic curve in the case where the number of data is relatively small, and FIG. 5 shows a characteristic curve in the case where the reflected wave originating from the radiated beam is disturbed by the state of the reflecting surface;

FIGS. 10a, 10b, 11a and 11b are illustrations for explaining the characteristics of reflection of a typical radiated beam in a known Doppler radar apparatus, of which FIGS. 10a and 11a are illustrations in which the road surfaces have different degrees of roughness, and FIGS. 10b and 11b are reflection characteristic graphs corresponding respectively to FIGS. 10a and 11a;

FIG. 12 is a flowchart showing the entire processes executed in the embodiment of the apparatus;

FIGS. 15a, 15b and 15c are graphs for explaining the difference between the known prior art apparatus and the embodiment based on experimental results, of which FIG. 15a is a graph showing the actual vehicle speed measured by means of a measuring wheel mounted on the vehicle rather than by means of a Doppler radar apparatus, FIG. 15b is a graph showing the actual vehicle speed measured by means of a prior art Doppler radar apparatus, and FIG. 15c is a graph showing the actual vehicle speed measured by the embodiment.

DETAILED DESCRIPTION OF THE INVENTION

First, an abstract of an embodiment of the present invention will be explained. In this embodiment, the periods of a Doppler signal is measured within a predetermined sampling time. A determination is made of the existence of road surface states which cause a reduction in the intensity of reflection in the main beam direction of an electric or acoustic wave. These states include the road surface being covered with a film of water due to rainfall, based on the degree of dispersion of the period data. A part of the collected data is discarded when such a road surface state is determined. The frequency remaining values of the remaining data are compared with upper and lower limit frequency values, the limit values being set based on the previous Doppler frequency $F(k-1)$. From the comparisons, the number of data Nm found between the upper and lower limit values is determined and an integrated value Sf of differences between these data and the previous Doppler frequency $F(k-1)$ is determined. Further, the number of period data Nl lower than the lower limit value and the number of period data Nh higher than the upper limit value are counted. The integrated value Sf and counted numbers Nm, Nh and Nl ar used to calculate the difference from the previous Doppler frequency $F(k-1)$ for calculating the present Doppler frequency $F(k)$. If the road surface is not in those states which are described above, then none of the data are discarded and the integrated value Sf and counted values Nm, Nh and Nl are similarly derived from all the date, and the present Doppler frequency F(k) is derived therefrom.

The above-described process ensures that the detection error is small even if the number of data samples is small, and that a high precision can be kept even when the road surface is covered with a film of water due, for example, rainfall.

Figure 6:
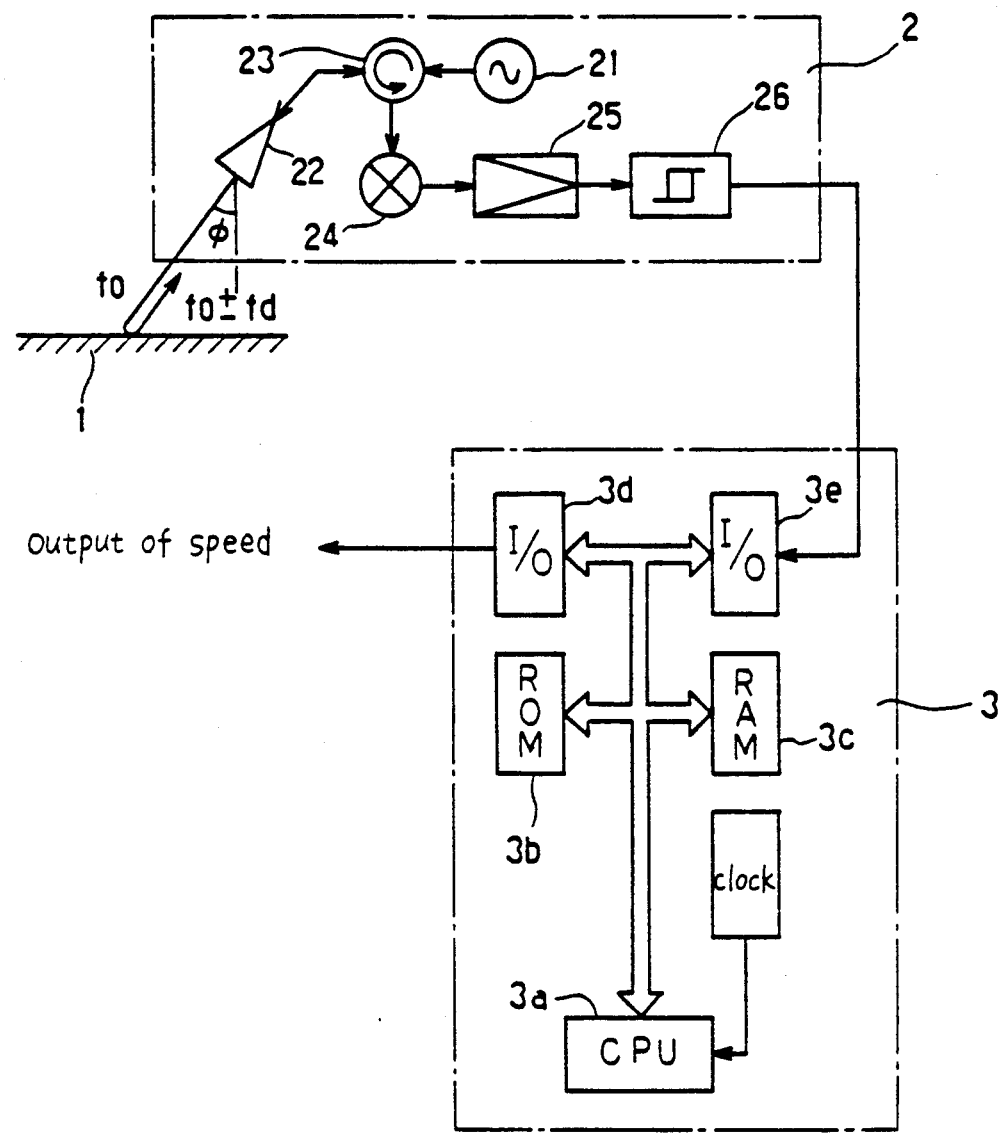
FIG. 6 is a schematic block diagram of a Doppler radar vehicle-speed detector constructed using an embodiment of the method according to the present invention.

A detailed description will now be given in conjunction with the drawings. FIG. 6 shows an embodiment of the invention including a Doppler radar section 2 for transmitting a microwave beam toward a road surface 1, receiving a reflected wave from the road surface 1 and obtaining a Doppler signal. The Doppler radar section 2 has an oscillator 21, a transmitting and receiving antenna 22, a circulator 23, a mixer 24, an amplifier 25 and a comparator 26. The output of Doppler radar section 2 goes to signal processor 3 that has a CPU 3A, ROM 3b, RAM 3c and an I/O circuit 3d and 3e.

Figure 2A:
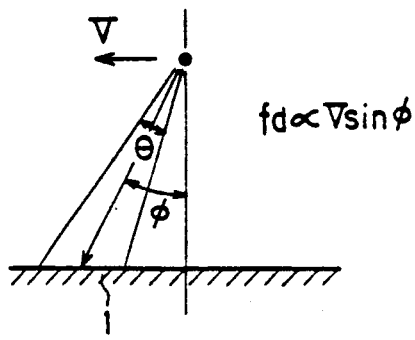
FIG. 2a is an illustration of a radiated beam for explaining the principle of a known Doppler radar apparatus.
Figure 2B:
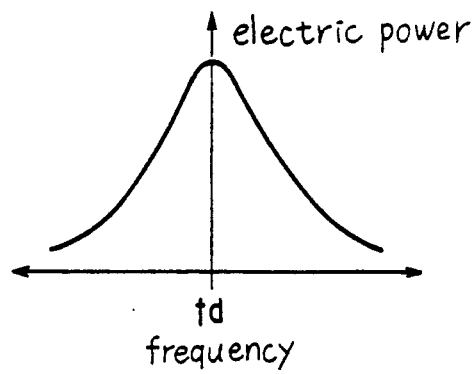

A constant voltage is supplied from a power source circuit (not shown) to the Doppler radar section 2 and the signal processor 3 when the ignition switch of an automobile is turned on. The Doppler radar section 2 is mounted on a lower portion of the automobile, and the antenna 22 is mounted such that a microwave beam is transmitted toward the road surface 1 at a predetermined angle $\phi$ to be incident thereon at an angle $\phi \pm \theta$ as previously described with respect to FIG. 2A.

The operation of this embodiment will now be described.

Figure 7:
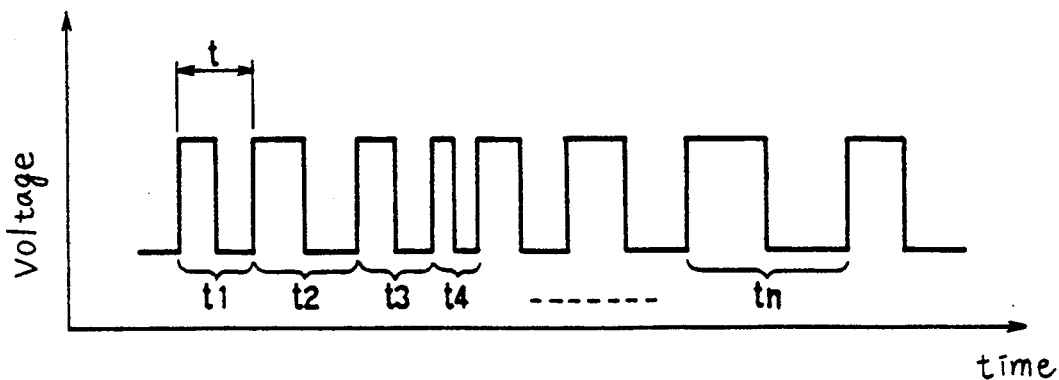
FIG. 7 is a graph showing the wave form of a pulse train signal input to a microcomputer of FIG. 6.

In the above arrangement, a constant voltage is supplied from the power source circuit to the Doppler radar section 2 and the signal processor 3 by turning on the ignition switch, and the Doppler radar section 2 will then begin to transmit and receive a microwave signal. That, is, the microwave output from the oscillator 21 is transmitted via the circulator 23 from the antenna 22 toward the road surface 1. The reflected wave from the road surface 1 is received by the antenna 22 and is input to the mixer 24 via the circulator 23. Meanwhile, part of the microwave signal from the oscillator 21 is directly input via the circulator 23 to the mixer 24, where it is mixed with the reflected wave received by the antenna 22, and is detected. The detected signal is passed through a capacitor (not shown) in mixer 24, amplified by the amplifier 25 and compared with a predetermined level by the comparator 26, whereby the signal is converted into a pulse train signal shown in FIG. 7 which is modulated with the pulse width dependant on the received signal. The pulse period t, in the pulse train signal, i.e. the time interval from the rise of one pulse to the rise of the next pulse, will vary from one pulse to another. The pulse train signal is input to the signal processor 3, where the CPU 3a of the signal processor 3 will process the signal in accordance with a predetermined program stored in the ROM 3b.

Figure 8:
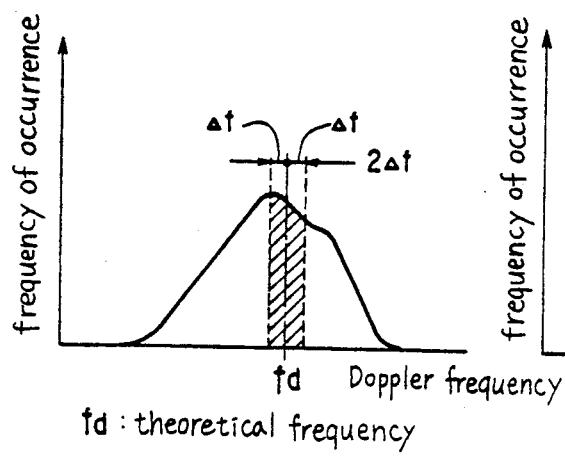
FIG. 8 is a characteristic graph for explaining the degree of dispersion for respective frequencies of the data obtained, thereby the explain the working principle of said embodiment.
Figure 9:
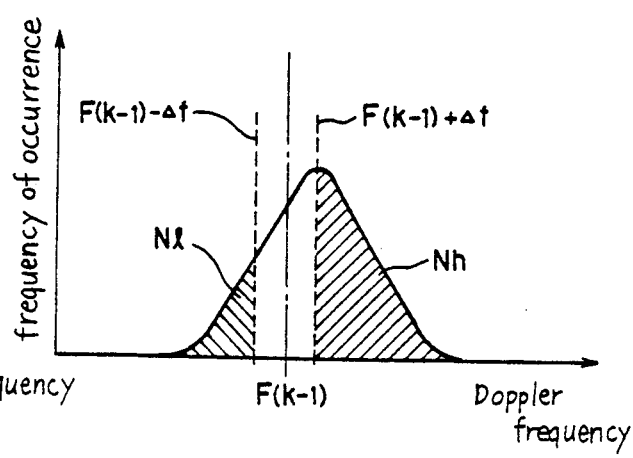
FIG. 9 is a characteristic graph like FIG. 8, showing a dispersion for schematically explaining the partition into three zones of the data obtained in said embodiment.

Before the operation of each step of the processing program is described, the concept of error reduction will be conceptually described in conjunction with FIG. 8 and 9, which are illustrations showing examples of the dispersion of the Doppler frequency.

The inventors have recognized that the cause for errors in this signal is that the Doppler signal has widely ranging frequency components. Therefore, if it is possible to extract only those data which are nearest the true Doppler frequency fd from all the sample data, as shown in FIG. 8, then it must be possible to reduce the error.

However, the true Doppler frequency fd is not known. The inventors have recognized, however that the present Doppler frequency will not change very much from the previous Doppler frequency therefore, in this embodiment, the previous Doppler measurement value $F(k-1)$ is used in place of the true Doppler frequency as a base or standard. Then, if the previous Doppler measurement value $F(k-1)$ is of a high precision, the present Doppler measurement value F(k) is a similar one which contains little error. On the other hand, in the initial state of the automobile, in which it is stopped, the Doppler frequency is zero, which is a true value.

Therefore, the inventors have recognized the possibility of reducing the error by setting limit values based on the previous Doppler measurement value $F(k-1)$, and using a short frequency change value $\Delta f$.

In this embodiment, the upper limit value $F(k-1)+\Delta f$ and lower limit value $F(k-1)-\Delta f$ based on the previous Doppler measurement value $F(k-1)$ are set to constant values so that the data of the Doppler signal corresponding to the maximum change of the automobile speed during the sampling time can be taken.

Now assuming that an accelerating operation is performed after the previous Doppler measurement value $F(k-1)$ has been taken the acceleration being such that the true Doppler frequency has become the upper limit value $F(k-1)+\Delta f$, as shown in FIG. 9. In this case, some (approximately half) of the data will be higher than $F(k-1)+\Delta f$ and therefore not suitable for calculating the new Doppler frequency, then the mean value within a frequency range having a width of $2\Delta f$ and centered at the previous Doppler measurement value $F(k-1)$ must not be equal to $F(k-1)+\Delta f$. That is, in such a case, an exact response cannot be achieved for acceleration or deceleration because less data is available. An increase in said frequency band width $2\Delta f$ will improve the response to acceleration or deceleration, but will increase the error. The number (Nh) of data which are higher than the upper limit value $F(k-1)+\Delta f$ and the number (Nl) of data which are lower than the lower limit $F(k-1)-\Delta f$, follow the expression: Nh>Nl during acceleration and Nh<Nl during deceleration. Thus, by using the numbers Nh and Nl of data which correspond to the magnitude of acceleration or deceleration to correct the mean value which is within the range having a frequency width of $2\Delta f$, the response corresponding to acceleration or deceleration can be improved.

Figure 10A:
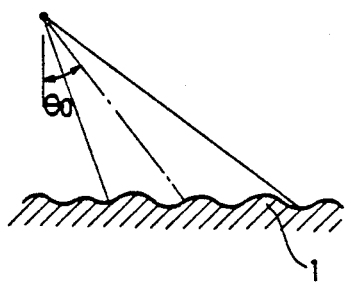
Figure 11A:
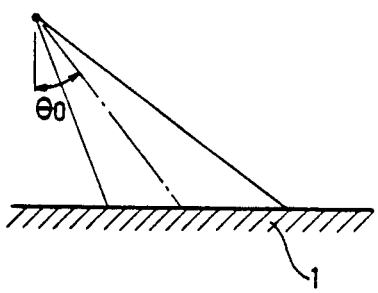
Figure 10B:
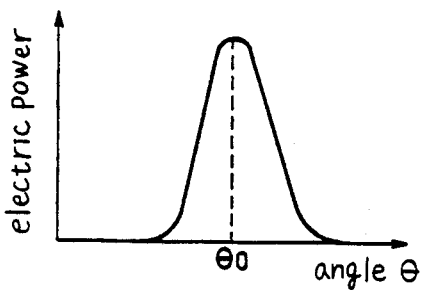
Figure 11B:
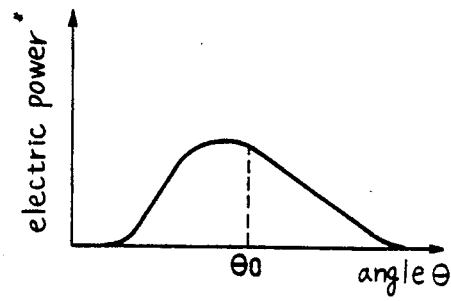

In the case of a road surface which is relatively rough such as an ordinary asphalt-paved road surface as shown in FIG. 10a, FIG. 10b shows the electric power distribution, showing the intensity of a reflected wave having its maximum at the beam center angle $\theta_0$. However, if the road surface is covered with a film of water due to, for example, rainfall and has become smooth as shown in FIG. 11a the larger the angle $\theta$ of the beam is, the smaller the energy of the reflected electric or acoustic wave is, therefore, the peak of the reflected intensity will deviate from the beam center angle $\theta_0$ as shown in FIG. 11b. It has thus been found by experiments that the occurrence distribution of the Doppler frequency will then extend to lower regions, as in the situation previously explained with respect to FIG. 5. It is then possible to substantially reduce the error associated with the road surface state by detecting from sample data that the road surface is in a state like that shown in FIG. 11a and 5, discarding those data located in low frequency regions so as to modify the frequency distribution into one which is generally similar to that which will appear when the automobile is running on an ordinary asphalt-paved road, and then performing the above-described step.

Next, the operation of each step of the processing program will be described.

FIG. 12 is a flow chart showing the major steps of the processes.

An initialization, such as clearing of each variable to be described, is performed only at the beginning of the processes (step 101) for the subsequent processes.

At step 102, period data $t_1, t_2, t_3, \ldots t_n$ of the pulse train signal (FIG. 7) are measured, and frequency data $f_1, f_2, f_3, \ldots f_n$ corresponding to respective period data are obtained from the inverses of these period data. At step 103, each obtained frequency data $f(n)$ is examined to determine the region Nl, Nh, etc., to which the data belongs. This process of step 103 is performed in accordance with a subroutine specified by a flowchart shown in FIG. 13.

Figure 13:
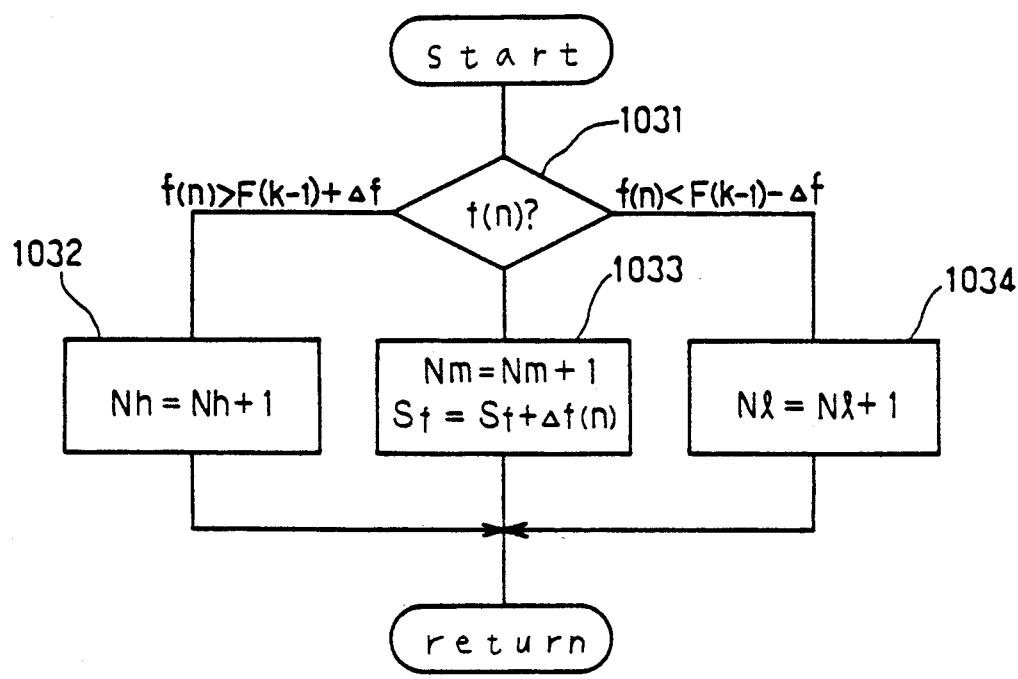
FIG. 13 is a flowchart showing details of processes included in FIG. 12.

In FIG. 13, at step 1031, the frequency data $f(n)$ obtained at step 102 is compared with the upper limit value $F(k-1)+\Delta f$ and lower limit value $F(k-1)-\Delta f$ based on the previous measurement value $F(k-1)$.

If $f(n) > F(k-1)+\Delta f$, then the variable Nh is incremented at step 1032, and if $f(n) < F(k-1)-\Delta f$, then the variable Nl is incremented at step 1034. Further, if $F(k-1)-\Delta f \leq f(n) \leq F(k-1)+\Delta f$, then the variable Nm is incremented at step 1033 and the variable Sf is updated by adding to the present variable Sf the difference $F(k-1)-f(n)=\Delta f_n$ between the previous measurement value $F(k-1)$ and the frequency data $f(n)$.

Returning to the main flowchart of FIG. 12, step 104 determines whether the time elapsed since the initiation of the data measurement amounts to a predetermined sampling time $T_s$. If the time elapsed does not amount to the predetermined sampling time $T_s$, then the sequence of processes previously described with respect to steps 102, 103 and 104 are repetitively performed until the predetermined sampling time $T_s$ is reached. Once the time elapsed has passed to step 105. Step 105 determines whether the road surface on which the automobile is now running is in a state like that shown in FIG. 11a, and derives from equation (1) a dispersion B(k) of the obtained frequency data $f_1, f_2, f_3, \ldots f_n$ (represented as $f(n)$, but represented as $f(i)$ in equation (1) based on the previous measurement value $F(k-1)$. A further normalizing by the previous measurement value $F(k-1)$ is performed to derive from equation (2) a dispersion $b(k)$. The equations (1) and (2) are as follows:

$$B(k) = \sum_{i=1}^{n} [F(k-1) - f(i)]^2/(n-1) \quad (1)$$

$$b(k) = B(k)/[F(k-1)]^2 \quad (2)$$

Figure 3:
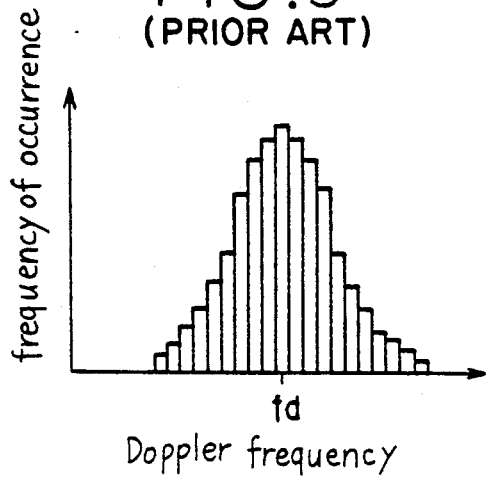
Figure 4:
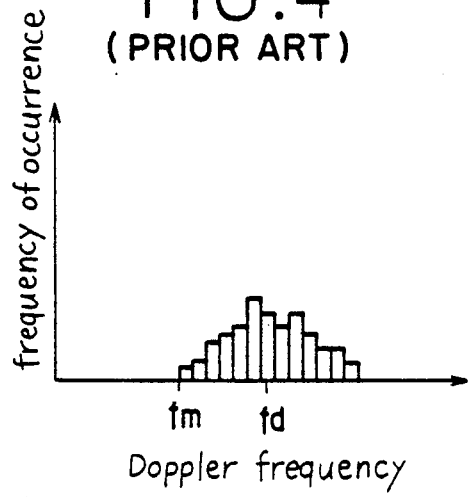
Figure 5:
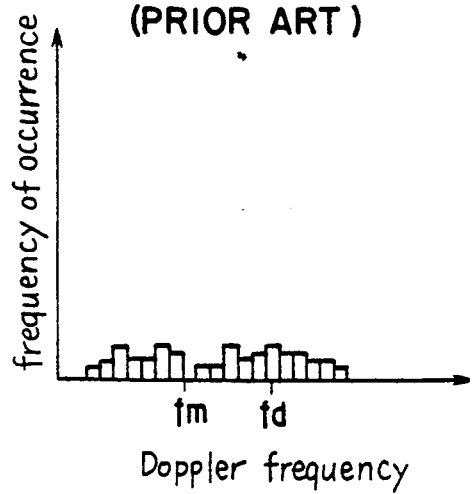

That is, the degree of the variable dispersion of the Doppler frequency, which may vary as shown in FIGS. 3, 4 and 5, can be expressed numerically. In the above equation (1), $F(k-1)$ is the previous measurement value, and $f(i)$ or $f(n)$ is the current value of the frequency data $f_1, f_2, f_3, \ldots f_n$ which can be successively determined during sampling.

The value $b(k)$ which numerically expresses the degree of dispersion may be derived by various mathematical and statistical methods other than using the equations (1) and (2).

Step 105 of FIG. 12 determines the condition of the road surface determining whether the normalized dispersion value $b(k)$ exceeds a predetermined value $b_0$.

Figure 14:
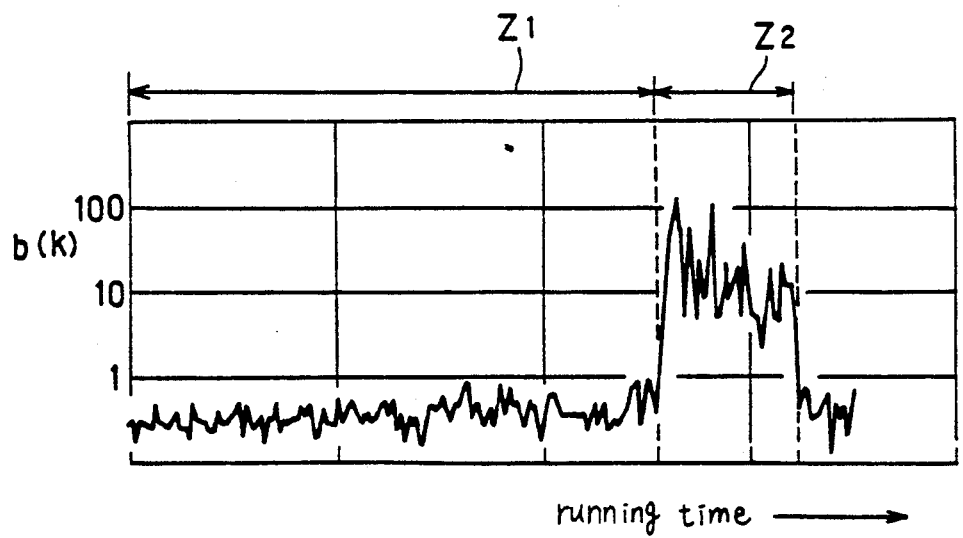
FIG. 14 is a graph showing a varying dispersion value for explaining the fact that the reflected wave originating from a known Doppler radar apparatus is affected by the road surface state.

FIG. 14 is a graph showing an experimental result taken during running of the automobile, in which the abscissa indicates running time and the ordinate indicates the aforementioned dispersion value $b(k)$. In this experiment, an automobile was operated to run from an ordinary asphalt-paved admission passage onto a resin passage (having a surface of plastics) covered with a film of water scattered thereon. In the FIGURE, $Z_1$ designates the asphalt-paved region and $Z_2$ the resin passage on which water has been scattered. As will be understood from FIG. 14, the normalized dispersion value $b(k)$ increases within the resin passage region $Z_2$ covered with a water film, whereby the road surface state can be clearly discriminated. Therefore, when the normalized dispersion value $b(k)$ exceeds the predetermined value $b_0$, the road surface is in a state in which the intensity of reflection in the main beam direction of the microwave has been greatly reduced, and control is passed to step 106 of FIG. 12.

At step 106, the value of the variable Nl representing the number of frequency data $f(n)$ which are lower than the lower limit value $F(k-1)-\Delta f$ obtained at step 103 is updated in accordance with the following equation (3):

$$Nl = Nl - (Nl + Nh + Nm) \cdot \alpha \quad (3)$$

and data in the low frequency region are discarded. Here, $\alpha$ represents a data discard ratio which is selected depending on the normalized dispersion value $b(k)$, and is described herein with reference to FIG. 16. Also, $(Nl+Nh+Nm)$ represents the total number of the data sampled at steps 102, 103 and 104. That is, several tens of percent of the total number are subtracted from the previous Nl value and the thus obtained new value is used for the steps subsequent to step 106. Thus, abnormal data within the low frequency region, which reflect the road surface state, are reduced, and then control is passed to step 107.

On the other hand, when the normalized dispersion value $b(k)$ is lower than the predetermined value $b_0$, control will proceed to step 107 without passing through step 106 and therefore data in the low frequency region are not discarded.

Returning again to the main flow chart of FIG. 12, step 107 shows that, a mean value of times $D(k)$ is derived from the number Nh of frequency data $f(n)$ which are higher than the upper limit value $F(k-1)+\Delta f$ and the number Nl of frequency data $f(n)$ which are lower than the lower limit value $F(k-1)-\Delta f$, using the following equation (5):

$$D(k) = (Nh - Nl)/(Nh + Nl + Nm) \quad (5)$$

$D(k)$ represents the degree of acceleration or deceleration of the automobile because, as previously described, $Nh > Nl$ during deceleration.

At step 108, the present Doppler measurement value $F(k)$ is calculated from the variables Sf and Nm derived at step 1033 of FIG. 13 and $D(k)$ derived at step 107, using the following equation (6):

$$F(k) = [F(k-1) + Sf/Nm] + Kf \cdot D(k) \quad (6)$$

where Kf represents a factor for correcting the response characteristics of the measured value to acceleration or deceleration, which is determined by experiment. The present Doppler measurement value is converted into a corresponding automobile speed a value V(k) using an equation or a map stored in a computer since fdV sin$\phi$, as previously described in conjunction with FIG. 1. At step 109, all the variables are initialized except the thus obtained Doppler measurement value F(k) for the next measurement. Subsequently, the sequence of step 102 and the following steps are repetitively executed.

Figure 15A:
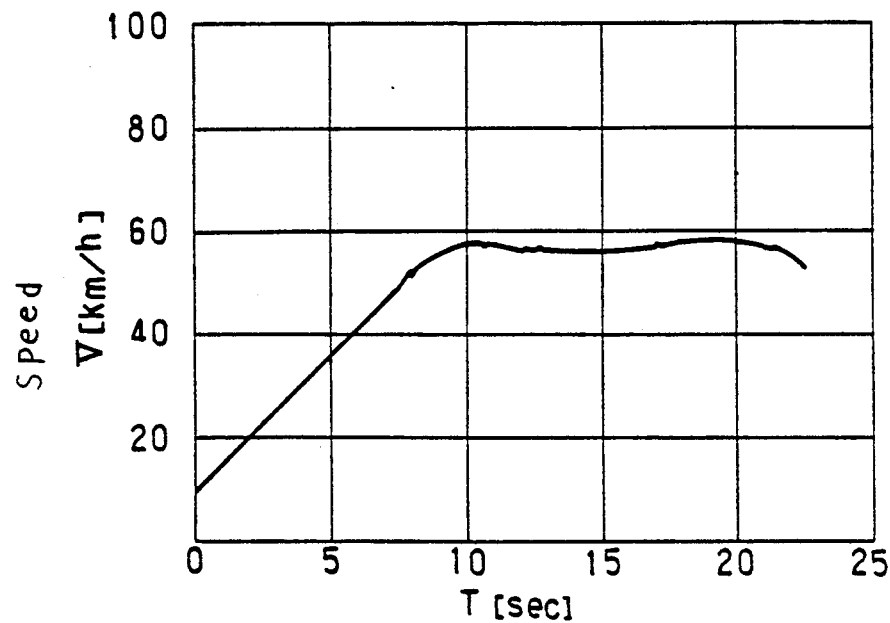
Figure 15B:
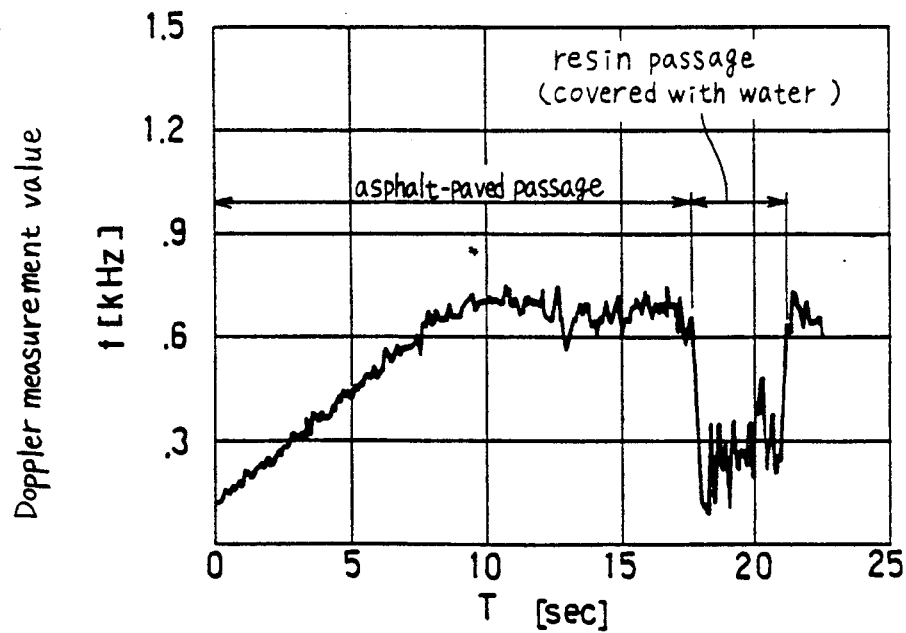
Figure 15C:
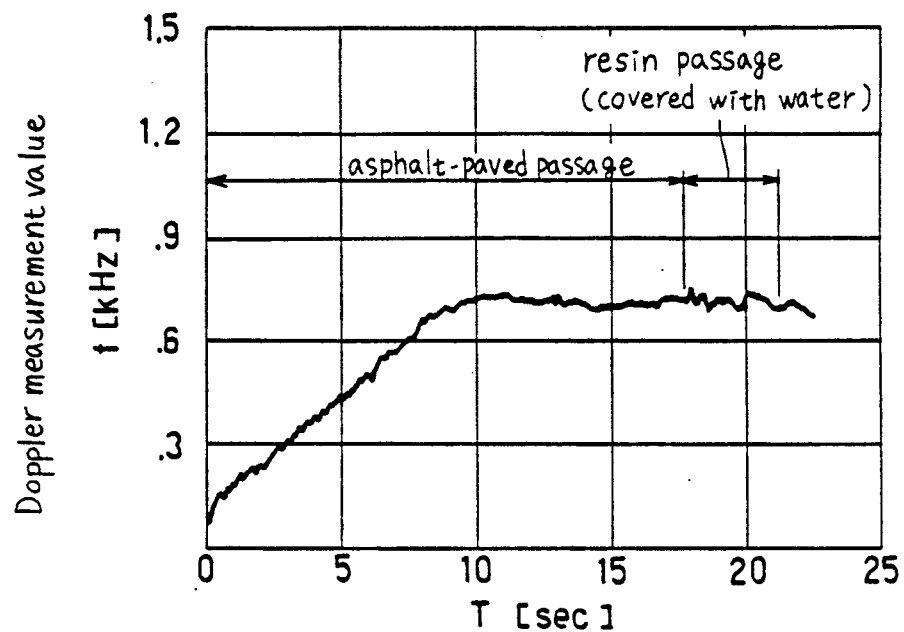

FIGS. 15a, 15b and 15c show an experimental result indicating the effect of the signal processing by the above-described embodiment. FIG. 15a shows the automobile's speed derived from the speed of a fifth measuring wheel mounted on the automobile in order to estimate the Doppler measurement values. FIG. 15b shows the Doppler measurement values derived by processing the pulse train signal from the Doppler radar section 2 in accordance with the above-described prior art method. FIG. 15c shows the Doppler measurement values derived by the signal processing by the above-described embodiment.

Conditions for the Doppler radar section 2 are:
frequency f=10.3(GHz),
antenna beam angle $\phi=40°$
half power beamwidth(angle from the central beam where radiated energy becomes 50% of central beam energy)=18°
sampling time $T_s$=o.1(sec), and $$\Delta f = Kf = 40(Hz).$$

Figure 16:
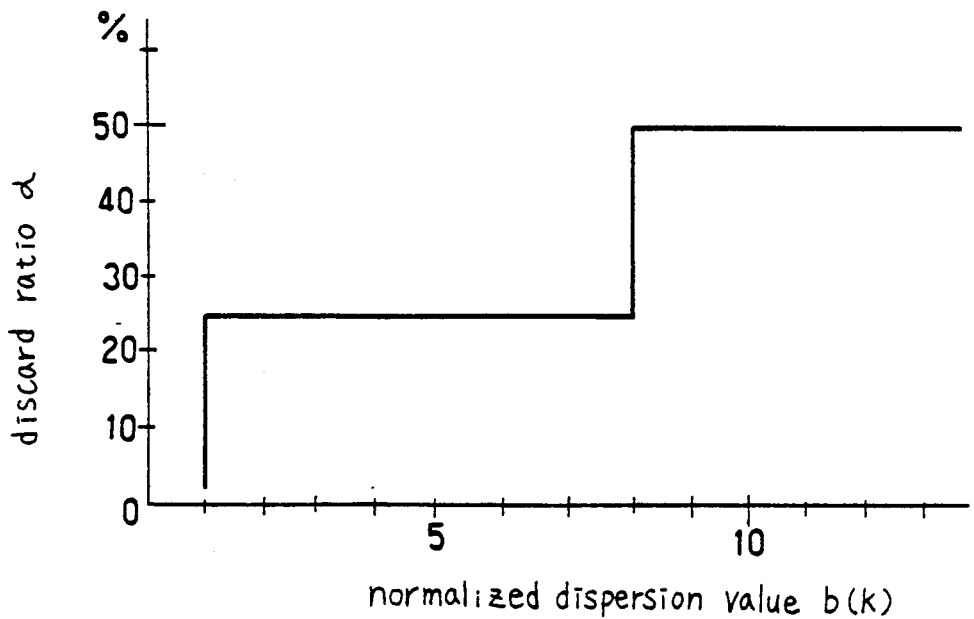
FIG. 16 is a discard ratio variation characteristic graph for the embodiment arranged such that the data discarding ratio is variable based on the degree of dispersion of data.

The discard ratio $\alpha$ used in the previously mentioned equation (3) is variable depending on the normalized dispersion value b(k) as shown in FIG. 16.

In the embodiment, the period data are converted into frequency data which are then further processed. However, the period data may be directly processed without being converted into frequency data. In such a case, the upper limit value F(k−1)+$\Delta$f, for example, is modified into 1/F(k−1)+$\Delta$f, and so on, and processing is executed using the variables Nm, Nl, Nh and Sf.

Further, in the embodiment, step 106 determines the value of the discard ratio $\alpha$ depending on the magnitude of the normalized dispersion b(k), as shown in FIG. 16, and corrects the variable Nl in accordance with equation (3). Instead of using such a discard ratio $\alpha$, however, discarding of data in the low frequency region may be performed by removing from collected data (for example, data of FIG. 5) those data of frequency lower than a reference (fm) which is the lowest possible frequency component (for example, fm of FIG. 4) occurring when the previous measurement value F(k−1) under road surface conditions of, for example, a dried asphalt-paved road, under which the intensity of the reflected wave in the main beam direction for the microwave will not be decreased.

In the above embodiment, the valve $\Delta$f has been described as being a constant value and therefore the upper limit value F(k−1)+$\Delta$f and the lower limit value F(k−1)−$\Delta$f are set to constant values based on the previous Doppler measurement value F(k−1). However, $\Delta$f may also be variable depending on the previous Doppler measurement value F(k−1), i.e. the automobile's running speed. In such a case, the frequency band width 2$\Delta$f between the limit values F(k−1)±$\Delta$f would be increasingly widened as the automobile's speed increases. According to a second embodiment, these limit values need not necessarily be set. In this embodiment, frequency data will then be compared with the previous Doppler measurement value F(k−1) and they are sorted into two regions based on the previous Doppler measurement value F(k−1). The present Doppler measurement value F(k) may then be calculated only by discriminating between acceleration and deceleration of the automobile based on the difference between the numbers of frequency data belonging to the two regions.

What is claimed is:

1. A Doppler radar speed detecting method for detecting a speed of a moving object based on the Doppler effect, comprising the steps of:

obtaining a plurality of measured data including information of a Doppler frequency indicative of a speed of said moving object from a reflected wave which is transmitted from said moving object and is reflected;

sorting said measured data obtained within a sampling time into a first group which are within a first frequency region which is higher than a previously obtained Doppler frequency value, and a second group which are within a second frequency region which is lower than said previously obtained Doppler frequency value;

counting numbers of said measured data that are in said first and second groups respectively;

calculating a correction value indicative of an amount that said moving object is accelerating or decelerating based on said number of said measured data in said first and second groups;

calculating a present Doppler frequency value based on said previously obtained Doppler frequency value and said correction value; and calculating a speed of said moving object based on said present Doppler frequency value.

2. A Doppler radar speed detecting method according to claim 1 wherein said step of sorting said measured data includes the steps of determining a upper limit value and a lower limit value on the basis of said previously obtained Doppler frequency value, comparing each said measured data obtained within a sampling time with said upper and lower limit values, and sorting said measured data into a first frequency region which is higher than said upper limit value as said first group, a second frequency region which is lower than said lower limit value as said second group and a third frequency region which is between said upper limit value and said lower limit value.

3. A Doppler radar speed detecting method according to claim 1 further comprising the steps of determining if a degree of dispersion among said measured data is larger than a predetermined quantity, and discarding a part of said measured data belonging to said second frequency region if so.

4. A Doppler radar speed detecting method according to claim 3, wherein said step of determining includes the steps of calculating a first dispersion value B(k) based on said measured data $f_1, f_2, f_n$ and said previously obtained Doppler frequency value F(k−1) by the following equation, $$B(k) = \sum_{i=1}^{n} \{F(k-1) - f(i)\}^2/(n-1),$$

where n is a number of data and calculating a second dispersion value b(k) which is normalized by said previously obtained Doppler frequency value $F(k-1)$ by the following equation.

$$b(K) = B(k)/\{F(k-1)\}^2$$

5. A Doppler radar speed detecting apparatus for detecting a speed of a moving object based on the Doppler effect comprising:
   deriving means for deriving a plurality of measured data including information of a Doppler frequency indicative of a speed of said moving object from a reflected wave which is transmitted from said moving object and is reflected;
   sorting means for sorting said measured data obtained within a sampling time into a first group which are within a first frequency region which is higher than a previously obtained Doppler frequency value, and a second group which are within a second frequency region which is lower than said previously obtained Doppler frequency value;
   counting means for counting respective numbers of said measured data that are in said first and second groups respectively;
   first calculating means for calculating a correction value indicative of an amount that said moving object is accelerating or decelerating, based on said number of said measured data in said first and second frequency regions;
   second calculating means for calculating a present Doppler frequency value based on said previously obtained Doppler frequency value and said correction value; and
   third calculating means for calculating a speed of said moving object based on said present Doppler frequency value.

6. A Doppler radar speed detecting apparatus according to claim 5 wherein said sorting means for sorting said measured data includes setting means for determining a upper limit value and a lower limit value on the basis of said previously obtained Doppler frequency value, comparing means for comparing said measured data obtained within a sampling time with said upper and lower limit values, and sorting means for sorting said measured data into a first frequency region which is higher than said upper limit value as said first group, a second frequency region which is lower than said lower limit value as said second group and a third frequency region which is between said upper limit value and said lower limit value.

7. A Doppler radar speed detecting apparatus according to claim 5 further comprising determining means for determining if a dispersion degree of said measured data is larger than predetermined quantity, and discarding means for discarding part of said measured data belonging to said second frequency region if so.

8. A Doppler radar speed detecting apparatus according to claim 7, wherein said determining means includes first calculating means for calculating a first dispersion value B(k) based on said measured data $f_1, f_2, \ldots f_n$ and said previously obtained Doppler frequency value $F(k-1)$ by the following equation, $$B(k) = \sum_{i=1}^{n} [F(k-1) - f(i)]^2/(n-1)$$

and second calculating means for calculating a second dispersion value b(k) which is normalized by said previously obtained Doppler frequency value $F(k-1)$ by the following equation $$b(k) = B(k)/[F(k-1)]^2.$$

9. A Doppler radar speed detecting method for detecting a speed of a moving object based on the Doppler effect, comprising the steps of:
   obtaining a plurality of measured data, each including information of a Doppler frequency indicative of a speed of said moving object from a reflected wave which is transmitted from said moving object and is reflected;
   sorting said measured data obtained within a sampling time into a first group which are within a first frequency region which includes a previously obtained Doppler frequency value, a second group which are within a second frequency region which is higher than said first frequency region and a third group which are within a third frequency region which is lower than said first frequency region;
   calculating an amount of transition from said previously obtained Doppler frequency value, based on said measured data within said first group;
   counting numbers of said measured data that are in said second and third groups respectively;
   calculating a correction value indicative of an amount that said moving object is accelerating or decelerating, based on said number of said measured data in said second and third groups;
   calculating a present Doppler frequency value based on said previously obtained Doppler frequency value, said amount of transition and said correction value; and
   calculating a speed of said moving object based on said present Doppler frequency value.

10. A Doppler radar speed detecting method according to claim 9, wherein said step of calculating an amount of transition includes the steps of calculating an integrated value of difference between said measured data belonging to said first group and calculating an amount of difference between said integrated value and said previously obtained Doppler frequency value.

11. A Doppler radar speed detecting method according to claim 9 further comprising the steps of determining if a dispersion degree of said measured data is larger than a predetermined quantity, and discarding part of said measured data belonging to said third frequency region if so.

12. A Doppler radar speed detecting method according to claim 11, wherein said step of determining includes the steps of calculating a first dispersion value B(k) based on said measured data $f_1, f_2, f_n$ and said previously obtained Doppler frequency value $F(k-1)$ by the following equation, $$B(k) = \sum_{i=1}^{n} \{F(k-1) - f(i)\}^2/(n-1),$$

where n is a number of data and calculating a second dispersion value b(k) which is normalized by said previously obtained Doppler frequency value F(k−1) by the following equation $$[f(k)]b(k) = B(k)/\{F(K-1)\}^2$$

13. A Doppler radar speed detecting method according to claim 11, wherein said step of sorting said measured data includes sorting said measured data into said first, second and third frequency regions by comparing said measured data with upper and lower limit values, said upper and lower limit values being set based on said previously obtained Doppler frequency value.

14. A Doppler radar speed detecting method according to claim 13, wherein said step of sorting said measured data includes the step of making said upper and lower limit values change, as a frequency bandwidth between said upper and lower limit values is widened as a speed of said moving object increases.

15. A Doppler radar speed detecting method according to claim 13, wherein said step of sorting said measured data so determines said upper and lower limit values to constant values so that said measured data corresponding to a maximum change of the speed during said sampling time can be taken.

16. A Doppler radar speed detecting apparatus for detecting a speed of a moving object based on the Doppler effect comprising:
   deriving means for obtaining a plurality of measured data including information of a Doppler frequency indicative of a speed of said moving object from a reflected wave which is transmitted from said moving object and is reflected;
   sorting means for sorting said measured data obtained within a sampling time into a first group which is within a first frequency region which includes a previously obtained Doppler frequency value, a second group which is within a second frequency region which is higher than said first frequency region and a third group which is within a third frequency region which is lower than said first frequency region;
   first calculating means for calculating an amount of transition from said previously obtained Doppler frequency value, based on said measured data belonging to said first group;
   counting means for counting numbers of said measured data that are in said second and third groups respectively;
   second calculating means for calculating a correction value indicative of an amount that said moving object is accelerating or decelerating, based on said number of said measured data in said second and third frequency regions;
   third calculating means for calculating a present Doppler frequency value based on said previously obtained Doppler frequency value, said amount of transition and said correction value; and
   fourth calculating means for calculating a speed of said moving object based on said present Doppler frequency value.

17. A Doppler radar speed detecting apparatus according to claim 16, wherein said first calculating means includes means for calculating an integrated value of difference between said measured data belonging to said first group and means for calculating said amount of transition from a difference between said integrated value and said previously obtained Doppler frequency value.

18. A Doppler radar speed detecting apparatus according to claim 16 further comprising determining means for determining if a dispersion degree of said measured data is larger than a predetermined quantity, and discarding means for discarding part of said measured data belonging to said third frequency region if so.

19. A Doppler radar speed detecting apparatus according to claim 18, wherein said determining means includes first calculating means for calculating a first dispersion value B(k) based on said measured data $f_1, f_2, f_n$ and said previously obtained Doppler frequency value F(k−1) by the following equation, wherein n is a data number of said measured data $$B(k) = \sum_{i=1}^{n} \{F(k-1) - f(i)\}^2/(n-1)$$

and second calculating means for calculating a second dispersion value b(k) which is normalized by said previously obtained Doppler frequency value [()F(k−1) by the following equation $b(k) = B(k)/\{F(k-1)\}^2$ 20. A Doppler radar speed detecting apparatus according to claim 16, wherein said sorting means sorts said measured data into said first, second and third frequency regions by comparing said measured data with upper and lower limit values, said upper and lower values being set based on said previous Doppler frequency value.

21. A Doppler radar speed detecting apparatus according to claim 20, wherein said sorting means includes means for making said upper and lower limit values change, as a frequency bandwidth between said upper and lower limit values is widened as a speed of said moving object increases.

22. A Doppler radar speed detecting apparatus according to claim 20, wherein said sorting means so sets said upper and lower limit values to constant values that said measured data corresponding to the maximum change of the speed during said sampling time can be taken.

* * * * *